US012447103B1

(12) United States Patent
Brandenburger

(10) Patent No.: US 12,447,103 B1
(45) Date of Patent: Oct. 21, 2025

(54) CLOSURE CAP FOR A MEDICAL CONTAINER AND METHOD FOR ASSEMBLY THEREOF

(71) Applicant: Fresenius Kabi Deutschland GmbH, Bad Homburg (DE)

(72) Inventor: Torsten Brandenburger, Reichelsheim (DE)

(73) Assignee: Fresenius Kabi Deutschland GmbH, Bad Homburg (DE)

( * ) Notice: Subject to any disclaimer, the term of this patent is extended or adjusted under 35 U.S.C. 154(b) by 0 days.

(21) Appl. No.: 18/724,086

(22) PCT Filed: Feb. 3, 2023

(86) PCT No.: PCT/EP2023/052658

§ 371 (c)(1),
(2) Date: Jun. 25, 2024

(87) PCT Pub. No.: WO2023/148317

PCT Pub. Date: Aug. 10, 2023

(30) Foreign Application Priority Data

Feb. 4, 2022 (EP) .................................... 22155096

(51) Int. Cl.
*A61J 1/14* (2023.01)
*B65D 51/00* (2006.01)

(52) U.S. Cl.
CPC .......... *A61J 1/1412* (2013.01); *B65D 51/002* (2013.01)

(58) Field of Classification Search
CPC ...... A61J 1/1406; A61J 1/1412; B65D 51/002
USPC ......... 215/247, 249, 250, 251, 252; 206/438
See application file for complete search history.

(56) References Cited

U.S. PATENT DOCUMENTS

| | | | | |
|---|---|---|---|---|
| 5,111,946 | A * | 5/1992 | Glanz | B01L 3/50825 215/249 |
| 5,147,054 | A * | 9/1992 | Pehr | B65D 51/20 215/253 |
| 5,678,713 | A * | 10/1997 | Derksen | A61J 1/1406 215/254 |
| 2007/0244466 | A1* | 10/2007 | Fangrow | A61J 1/2079 604/411 |
| 2009/0054865 | A1 | 2/2009 | Brandenburger et al. | |
| 2010/0059474 | A1 | 3/2010 | Brandenburger et al. | |

(Continued)

FOREIGN PATENT DOCUMENTS

| | | |
|---|---|---|
| DE | 102007005407 | 8/2008 |
| EP | 1625873 | 2/2006 |

(Continued)

OTHER PUBLICATIONS

International Search Report (with English translation) and Written Opinion, counterpart International Appl. No. PCT/EP2023/052658 (Apr. 26, 2023) (11 pages).

*Primary Examiner* — Jacob K Ackun
(74) *Attorney, Agent, or Firm* — Cook Alex Ltd.

(57) ABSTRACT

The invention relates to a closure cap for a container filled with a medical liquid. The closure cap has at least one connection with a scaling element which can be pierced by a spike or a needle to remove the medical fluid. A flap is arranged on an inner side of the closure cap and is connected to the main body by means of a hinge. The sealing element is fixed to the closure cap by the flap folded against the main body.

18 Claims, 11 Drawing Sheets

(56) References Cited

U.S. PATENT DOCUMENTS

| | | | | |
|---|---|---|---|---|
| 2011/0005622 | A1 * | 1/2011 | Boeckeler | B01L 3/50825 220/254.9 |
| 2018/0055734 | A1 | 3/2018 | Brandenburger et al. | |

FOREIGN PATENT DOCUMENTS

| | | |
|---|---|---|
| WO | WO2015/135631 | 9/2015 |
| WO | WO2016/156242 | 10/2016 |

* cited by examiner

CLOSURE CAP FOR A MEDICAL CONTAINER AND METHOD FOR ASSEMBLY THEREOF

The present application is a U.S. National Stage of PCT International Patent Application No. PCT/EP2023/052658, filed Feb. 3, 2023, which claims priority to EP Application Serial No. 22155096.5, filed Feb. 4, 2022, both of which are hereby incorporated herein by reference.

Field of the Invention

The invention relates to a closure cap for a container filled with a medical liquid, which is designed in particular as a bottle. The invention further relates to a method for assembling the closure cap of a medical container.

Background of the Invention

For storing medical liquids, such as infusion solutions, containers, in particular bottles, are known which have a pierceable sealing element in order to remove the liquid by means of a transfer device, for example by means of a spike of a transfer system, or to inject liquid, such as for example a pharmaceutical active ingredient, into the medical container, for example by means of a needle syringe.

The sealing element is in particular resealable and is pierced with a spike or needle. Spikes are secretly referred to as hollow needles that have a larger diameter than metal needles and are usually made of plastic or metal.

However, the basic principle is the same: a hollow needle is inserted into an elastic sealing element, which seals itself again automatically after the hollow needle is pulled out.

Bottles filled with a medical liquid are in particular well-known and are manufactured using the so-called blow-fill-seal process. A main body is blown out of plastic, then filled with the medical liquid, hermetically sealed and finally connected to a closure cap which is provided with the sealing element.

Such a container is known in particular from the document WO 2016/156242 A1 (Fresenius Kabi Deutschland GmbH). The closure cap shown in this document comprises a sealing element designed to be convex on the upper side. The sealing element can be easily wiped clean, which is required by regulatory requirements in some countries.

In order to fix the sealing element in the cap, the sealing element has an annular, axially extending web on the edges of the upper side and lower side, which sits in a complementarily designed groove of the closure cap.

To mount the sealing element, it can be inserted into the closure cap, viewed from the inside. Then, a collar of the closure cap extending around the sealing element is flanged such that the sealing element is fixed and clamped in such manner that sufficient tightness is ensured and the sealing element is held securely.

Flanging the collar requires a suitable system, which can be complex to set up depending on the system, in particular if it is located in an aseptic part of the production plant, for example.

OBJECT OF THE INVENTION

The invention is therefore based on the object of simplifying the assembly of the sealing element or sealing elements of a closure cap for a container filled with a medical liquid. At the same time, the closure cap should be particularly safe, both during assembly and during subsequent use of the closure cap in the assembled state on the medical container.

SUMMARY OF THE INVENTION

The object of the invention is already achieved by a closure cap for a container filled with a medical liquid and by a method for assembling a closure cap for a container filled with a medical liquid according to one of the independent claims.

Preferred embodiments and further developments of the invention can be inferred from the subject matter of the dependent claims, the description and the drawings.

The invention relates to a closure cap for a container filled with a medical liquid, with the closure cap having at least one connection with a sealing element which can be pierced with a spike or a needle to remove the medical liquid, with a flap being arranged on an inner side of the closure cap which is connected to the base body by means of a hinge, and with the sealing element being fixed to or in the closure cap by the flap folded against the base body. The medical liquid is preferably a medical liquid for infusion, for transfusion, for enteral nutrition, for parenteral nutrition and/or a rinsing solution.

According to claim 1, the invention is described by a closure cap for a container filled with a medical liquid, with the closure cap having a base body and at least one connection with a sealing element which can be pierced with a spike or a needle to remove the medical liquid, characterised in that a flap is arranged inside on an underside of the base body of the closure cap and is connected to the base body by means of a hinge, with the sealing element being fixed to the closure cap by the flap folded against the base body.

The closure cap is designed in particular as a plastic injection-moulded part, in particular made of polypropylene and/or polyethylene.

The base body of the closure cap is formed by a bottom and a side wall. The flap is located on the inner side of the bottom of the base body.

The closure cap preferably has a connection flange for the base body of a medical container. For example, the closure cap can be welded or glued to the base body.

The connection with the at least one sealing element can, for example, be designed as a nozzle in which an elastic sealing element sits, which can be pierced with a spike or a needle at least to remove the medical liquid. Generally, the sealing element is pierced with a spike to remove the medical liquid.

The sealing element is preferably self-resealing. When providing a sealing element for a hollow needle, in particular made of metal, the sealing element can be designed as a closed membrane. A channel pierced with the needle closes automatically when the needle is pulled out again due to the elasticity of the sealing element. For example, a pharmaceutical active ingredient can be added to the medical liquid by means of a needle syringe.

In particular, when using spikes to remove the medical liquid, the sealing element can also comprise at least one slot or punched hole, which expands when the spike is inserted and automatically contracts again when the spike is pulled out due to the elasticity of the material.

The flap on the inner side of the closure cap is understood to be a pivoting component which is connected to the base body by means of a hinge in order to be opened from the inner side onto the underside of the closure cap when used as intended.

The flap thereby connects to the base body, in particular by latching, and thus fixes the sealing element. The sealing element is clamped or compressed in particular by the flap. This ensures sufficient tightness and fixation.

At the same time, as is provided in a preferred embodiment of the invention, the sealing element can also be connected to the closure cap in a form-fitting manner. Such a form-fitting connection can in particular reliably prevent the sealing element from being pushed out during piercing.

Due to the internal arrangement of the flap, it is safely protected against mechanical manipulation, as it is located inside the closed container in the closed state.

At the same time, a foldable flap enables particularly simple and safe assembly of the closure cap, both when using a machine designed for this purpose and when the closure cap is assembled manually.

The closure cap can therefore also be used in particular advantageously in smaller production plants where the provision of complex machinery should be avoided wherever possible.

In a preferred embodiment of the invention, the base body is designed to be pot- or cup-shaped. The base body is formed by the bottom and the side wall. In detail, the flap is located on the inner side of the bottom of the base body.

Preferably, the opened flap is also located completely within the closure cap and does not protrude beyond the lower edge of the base body.

This ensures, for example during transport of the closure caps, that the flap is not exposed to any mechanical stress.

In one embodiment of the invention, the sealing element is closed or provided with a tamper-evident closure.

In particular, the sealing element can be covered with a break-off piece which is connected to the base body of the closure cap via a predetermined breaking point surrounding the sealing element.

Such a break-off piece offers a high level of safety and can also be provided together with the base body as a one-piece plastic injection-moulded part.

The predetermined breaking point is designed in particular as a weakened zone which extends directly around an upper side of the sealing element. This means that the sealing element is accessible after the break-off piece has been broken off and can be wiped off if necessary.

In one embodiment of the invention, the sealing element comprises a circumferential annular retaining flange or annular web, which sits in a groove of the base body and/or the flap.

A form-fitting connection between the sealing element and the base body and/or the flap is therefore ensured at the edge by at least one annular, axially extending web.

This means that the sealing element is not pushed out even under strong mechanical stress during piercing.

Furthermore, the use of the flap makes it particularly easy to provide a stable form-fitting connection. In particular, the design of the form-fitting connection is not limited by the manufacturing process, as is the case with flanging, for example.

Preferably, the flap folded against the base body is latched with the base body. In the latched state, the flap is preferably arranged parallel to an upper side of the base body.

The flap can in particular be designed as a plate which comprises at least one opening in which a piercing region of the sealing element is located.

In a preferred embodiment, the hinge is designed as a film hinge. The flap can thus be provided together with the base body as a one-piece plastic injection-moulded part.

In a further development of the invention, the closure cap comprises at least two, in particular exactly two, connections, each with a sealing element. The closure cap can also have three or more connections.

The presence of two connections can, for example, serve to fill a medical liquid, for example with a pharmaceutical active ingredient, into the container via a first connection when using the medical container and to remove the mixture 20 produced via a second connection.

Furthermore, different sealing elements can also be used to provide two different connections, for example one connection for a spike (for removal) and another connection for a needle (for addition).

In particular, with three connections, an additional Luer connection can be provided for connecting a Luer syringe or a Luer-Lock syringe. In one embodiment, all sealing elements are designed to be wipeable.

Preferably, in these embodiments of the invention, the flap is designed as a single flap which fixes the sealing elements of the at least two connections on or in the closure cap.

Accordingly, the flap can also have two or more through-holes which, in the assembled state, overlap with the piercing region of a sealing element.

The through-holes can in particular be arranged next to one another.

The flap can have a narrow side and a long side. In particular, the flap can be designed to be substantially rectangular with a long side and a narrow side.

Preferably, the hinge is arranged on the long side of the flap and the flap is latched to the base body on the opposite long side in the assembled state.

In the assembled state, the flap is preferably connected to the base body over at least half of its length.

In particular, the hinge can extend over the entire long side of the flap. This enables a robust design.

Furthermore, the flap can rest against a projection of the base body at the corners opposite the hinge, in particular be latched to the base body.

This provides additional security for the flap and prevents mechanical stress on the film hinge in the direction of its axis, which can occur, for example, if a spike is pressed at an angle into the sealing element.

The flap can in particular be latched at a corner opposite the hinge, with a latching body of the base body engaging around the corner of the flap. The corner can also be rounded for this purpose. In particular, the flap can be designed over its circumference, at least in sections, as a circular segment running concentrically to the connection. The space present on the inside of the closure cap can thus be used optimally.

The invention further relates to a container filled with a medical liquid, which is in particular designed as a bottle.

In one embodiment, the container is a plastic container produced by means of a blow-fill-seal process (BFS), which is closed, in particular welded or glued, with the closure cap. In a further embodiment, the container is a container produced from a preform by means of a stretch-blow-moulding process, which is closed, in particular welded or glued, with the closure cap.

The medical liquid is a liquid which is used for medical purposes and is preferably administered intravenously. In a preferred embodiment, the medical liquid is an infusion solution or rinsing solution. Possible examples of such infusion solutions and rinsing solutions include sterile water;

saline solutions, in particular solutions containing NaCl, KCl, CaCl and/or Mg;

solutions containing carbohydrates, in particular glucose solutions;
- solutions, emulsions and/or suspensions containing nutrients for parenteral nutrition, in particular lipids, amino acids and/or glucose;
- colloid solutions, in particular for blood replacement therapy (e.g. Voluven®); and/or
- so-called premixed systems in which an active ingredient, e.g. paracetamol, has already been added to the medical liquid.

Preferably the container is sterilised. In particular, it can be a sterile container which is aseptically filled and closed with a similarly sterile cap or is lastly autoclaved.

The invention further relates to a method for assembling a closure cap for a container filled with a medical liquid.

In particular, the invention relates to a method for assembling the closure cap described above and in particular a container provided with the closure cap and containing a medical liquid.

The method comprises the following steps:
- providing a closure cap which has a base body with at least one opening for a connection, with the closure cap having on an inner side a flap with at least one opening which can be folded relative to the base body;
- inserting a sealing element inside in front of the opening of the base body or in front of the opening of the flap;
- folding the flap onto the base body, with the flap being fixed in an end position on the base body and the sealing element being fixed between the opening of the base body and the opening of the flap.

The method claim describes a method for assembling a closure flap for a container filled with a medical liquid, in particular for a container described above, comprising the steps:
- providing a closure cap which has a base body with at least one opening for a connection, with the closure cap having inside on an underside of the base body a flap with at least one opening which can be folded relative to the base body;
- inserting a sealing element inside in front of the opening of the base body or in front of the opening of the flap;
- folding the flap onto the base body, with the flap being fixed in an end position on the base body and the sealing element being fixed between the opening of the base body and the opening of the flap.

The method enables simple and safe assembly of the closure cap, both by means of an automated device and by hand.

In a preferred embodiment, the sealing element is already centred and held securely in position or so as not to be lost when it is inserted into the opening of the base body or the flap.

Depending on the design, the sealing element can be inserted either into the flap or into the base body, with it being clamped due to an interference fit and the elastic material in such manner that it does not accidentally fall out again. The final fixation of the sealing element is achieved by closing and latching the flap.

BRIEF DESCRIPTION OF THE DRAWINGS

The invention will be explained in more detail below with reference to an exemplary embodiment of the invention on the basis of the drawings FIG. 1 to FIG. 19.

DETAILED DESCRIPTION OF THE DRAWINGS

Figure 1:
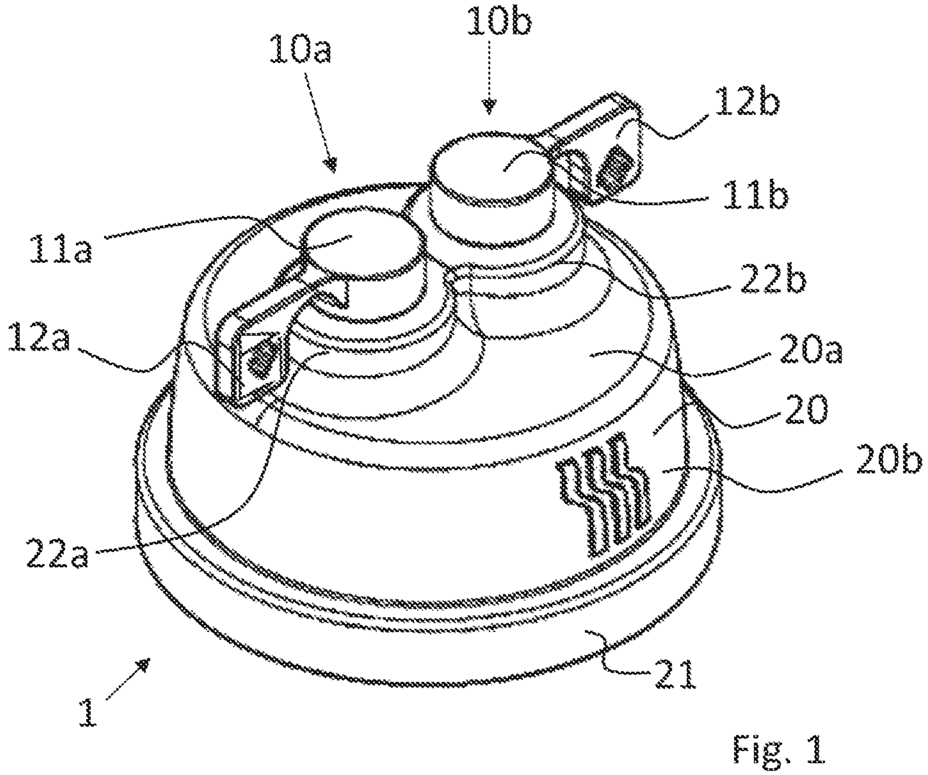
FIG. 1 is a perspective view of an exemplary embodiment of a closure cap according to the invention.

FIG. 1 is a perspective view of a closure cap 1 according to an exemplary embodiment of the invention.

The closure cap 1 is designed to be pot-shaped and comprises a base body 20 with a connection flange 21 for connection to the head region of a medical container. The base body 20 is formed by the bottom 20*a* and the side wall 20*b*. The side wall 20*b* extends over the circumference of the bottom 20*a*. The bottom 20*a* provides the underside of the base body 20. Since the closure cap 1 is fitted with its open side onto the head part 3 of a container 2 (see, for example, FIG. 18), the bottom 20*a*, in the fitted state, provides the upper end, so to speak the lid of the closure cap 1.

On its upper side, the closure cap 1 in this exemplary embodiment comprises two connections 10*a*, 10*b*.

The connections 10*a*, 10*b* each comprise a connection nozzle 22*a*, 22*b*, which is a part of the base body 20 in the sense of the terminology of the present invention.

A sealing element 40 is arranged within each of the connection nozzles 22*a*, 22*b*, the piercing region 41 of which is covered by a break-off piece 11*a*, 11*b*. The break-off pieces 11*a*, 11*b* each comprise a radially outwardly projecting wing grip 12*a*, 12*b*. The wing grips 12*a*, 12*b* form a lever which facilitates the removal of the break-off pieces 11*a*, 11*b*.

Figure 2:
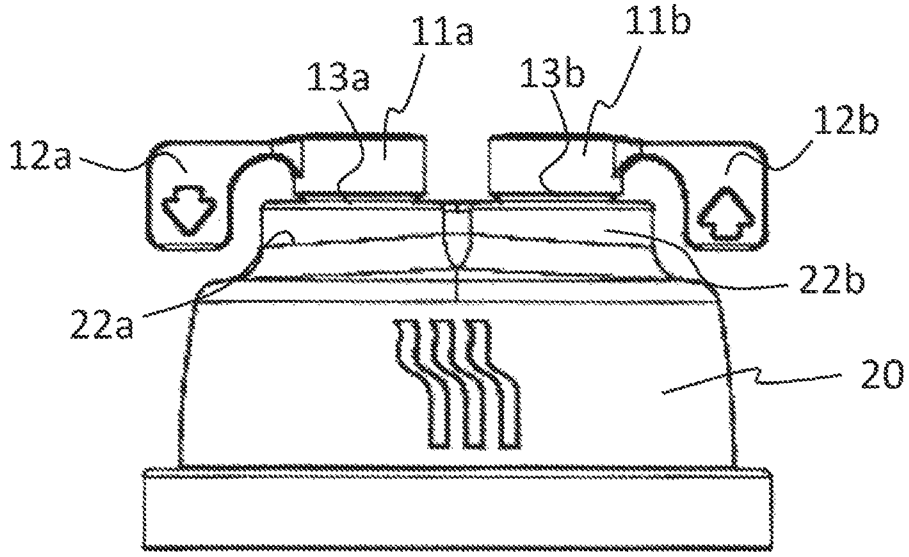
FIG. 2 is a side view.

As represented in the side view according to FIG. 2, the connection nozzles 22*a*, 22*b* merge into one another in this exemplary embodiment. This ensures a particularly space-saving arrangement.

The break-off pieces 11*a*, 11*b* are connected to the base body 20 or the connection nozzles 22*a*, 22*b* via predetermined breaking points 13*a*, 13*b*. The predetermined breaking points 13*a*, 13*b* are designed as weakening zones in which the wall thickness of the break-off pieces 11*a*, 11*b* is reduced in order to facilitate breaking off.

In the two wing grips 12*a* and 12*b* an arrow is provided which identifies the connection nozzle as a connection for supply or removal. The arrow in the wing grip 12*a* marks the connection nozzle 22*a* as a connection for supplying a liquid, for example a medication, into the container 2. The arrow in the wing grip 12*b*, on the other hand, marks the connection nozzle 22*b* as a connection for removing the medical liquid from the container 2. The arrows are inserted here as recesses in the wing grips.

Figure 3:
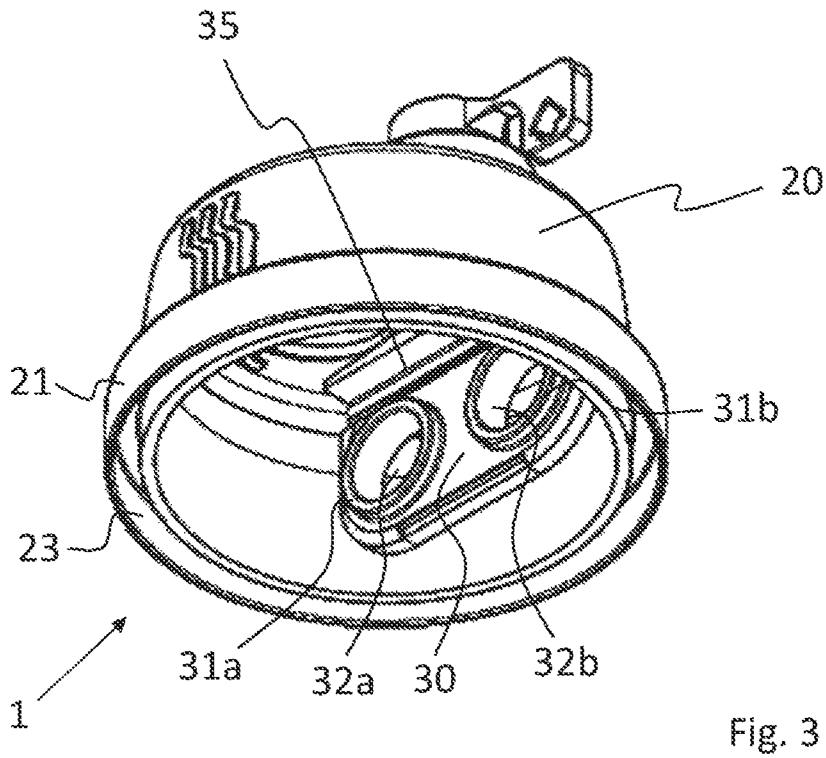
FIG. 3 is a perspective view from below showing the inner side.

FIG. 3 shows a perspective view of the underside or inner side of the closure cap 1. The unassembled state without sealing elements 40 is represented.

In this exemplary embodiment, the connection flange 21 comprises a circumferential groove 23, which can be fitted on the head part 3 of a container 2 and thus welded or glued to the head part 3.

A flap 30 is arranged on the inner side on the underside of the base body 20. In detail, the flap 30 is arranged on the inner side of the bottom 20*a* of the base body 20. In the unassembled state, the flap 30 can be positioned approximately at a right angle to the underside of the base body 20.

The flap 30 is plate-shaped and comprises two openings 32*a*, 32*b*, which, in the assembled state, overlap with the piercing region 41 of the sealing element 40.

The openings 32*a*, 32*b* are surrounded by an annular web 31*a*, 31*b*, which, in the assembled state, serves as a form-fitting element for the sealing element 40, in that the web 31*a*, 31*b* rests against a ring 44 of the sealing element 40. The flap 30 can be folded against the underside of the base body 20 via a film hinge 35.

Figure 4:
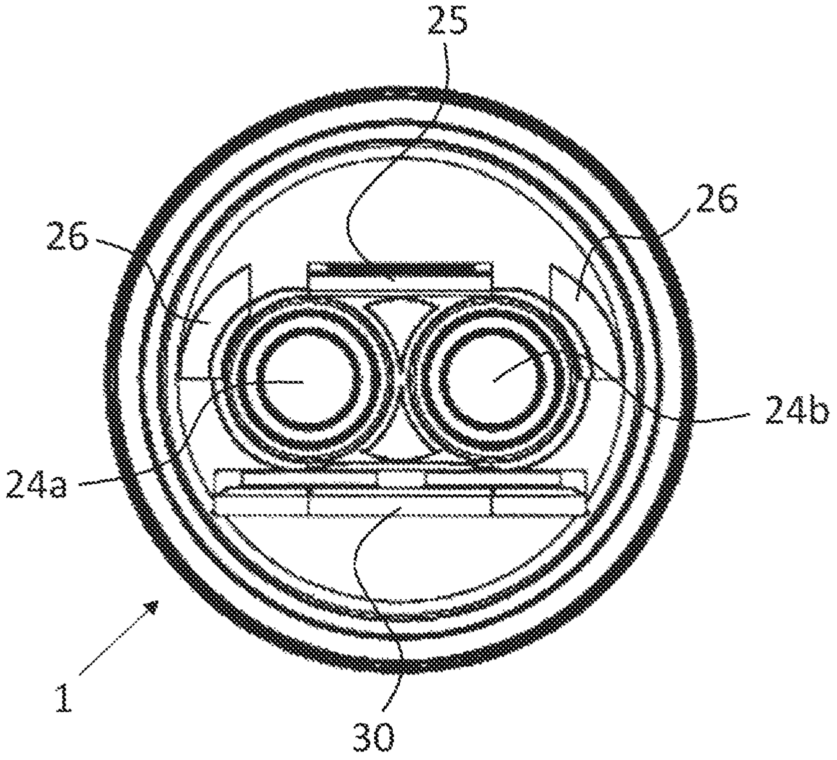
FIG. 4 is a plan view of the underside.

FIG. 4 shows the closure cap 1 in a plan view of the underside or inner side. The connection nozzles 22*a*, 22*b* of the base body also comprise openings 24*a*, 24*b*, which, in the assembled state, overlap with the piercing region 41 of the sealing element 40 and with the openings 31*a*, 31*b* of the flap 30.

FIG. 4 also shows the non-assembled state in which the flap 30 is folded downwards. The flap 30 comprises a long side and a narrow side.

On the opposite side of the film hinge 35, a latching element 25 is arranged on the underside of the base body opposite the long side of the flap 30.

Furthermore, two edge-side latching elements 26 run concentrically around the openings 24*a*, 24*b*, which, in the assembled state, enclose the edges of the flap 30 opposite the film hinge 35.

To assemble the closure cap, the sealing elements 40 (see FIG. 7, FIG. 8) can be inserted into the openings 24*a*, 24*b* and then the flap 30 is closed and latched in the assembled state.

As represented in FIG. 3, the openings 32*a*, 32*b* are surrounded by an annular web 31*a*, 31*b*, which serves as a form-fitting element for a groove 42 of the sealing element 40.

Figure 5:
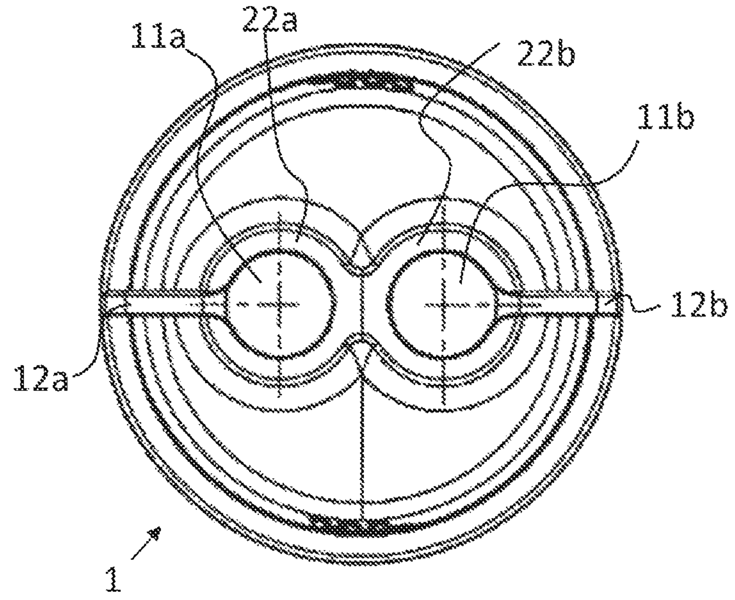
FIG. 5 is a plan view of the upper side.

FIG. 5 is a plan view of the upper side of the closure cap. The wing grips 12*a*, 12*b* for breaking off the break-off pieces 11*a*, 11*b* extend approximately to the outer edge of the closure cap 1 in the plan view from above ("above" in the sense of the terminology are the connections 10*a*, 10*b*, even if, for example, when using the container 2 for infusion, the connections are arranged at the bottom, i.e. the container 2 is used upside down).

Figure 6:
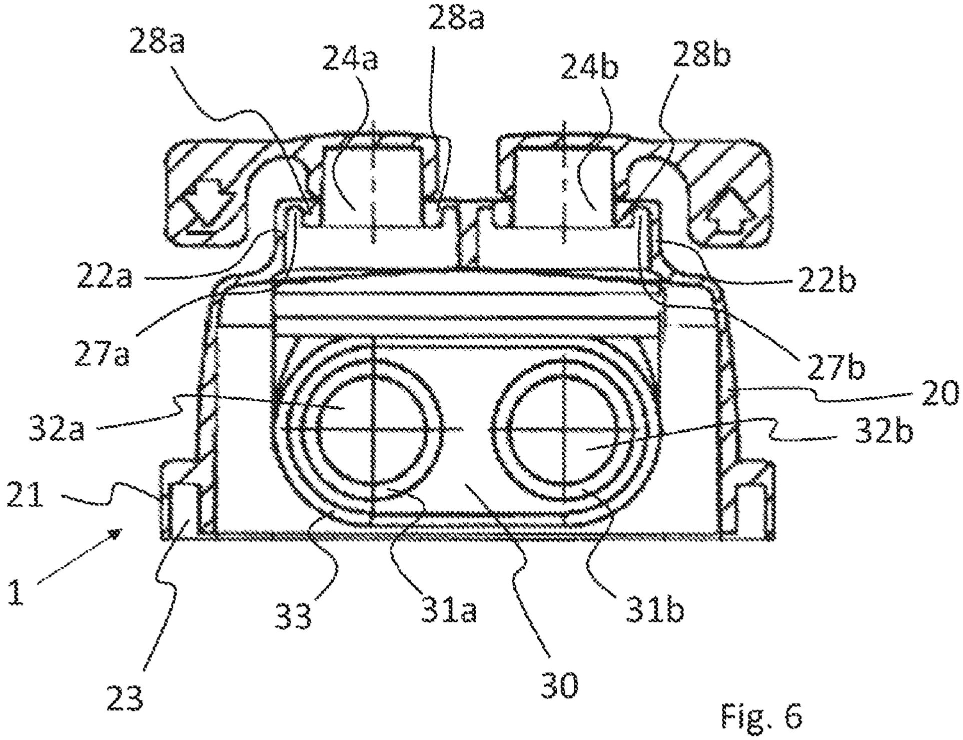
FIG. 6 is a longitudinal section of the closure cap.

FIG. 6 is a longitudinal section of the closure cap, which runs centrally through the connections 10*a*, 10*b*. The section is directed at the downwardly folded flap 30, which does not protrude beyond the underside of the closure cap 1 and extends to the connection flange 21. The flap 30 is designed to be plate-shaped.

In the assembled state, the openings 32*a*, 32*b* run concentrically to the openings 24*a*, 24*b* of the base body 20 or the nozzles 22*a*, 22*b*, in each of which a sealing element 40 sits in the assembled state.

An annular web 28*a*, 28*b* extends around the openings 24*a*, 24*b*, through which an annular groove 27*a*, 27*b* is formed, which extends axially and in which a ring 43 or annular web of the sealing element 40 sits in the assembled state. Furthermore, a chamfer 33 extends at least around the side opposite the film hinge 35 and the narrow sides on the edge of the flap 30, which forms a ramp for pushing away the latching elements 25, 26 when the flap 30 latches when it is closed.

The connection nozzles 22*a*, 22*b* merge into one another such that a wall in the form of the web 28 is formed between the connection nozzles 22*a*, 22*b*. Starting from this common web 28, the walls of the connection nozzles 22*a*, 22*b* diverge such that in the plan view from above they each form rings which overlap in the region of the web (see FIG. 5).

Figure 7:
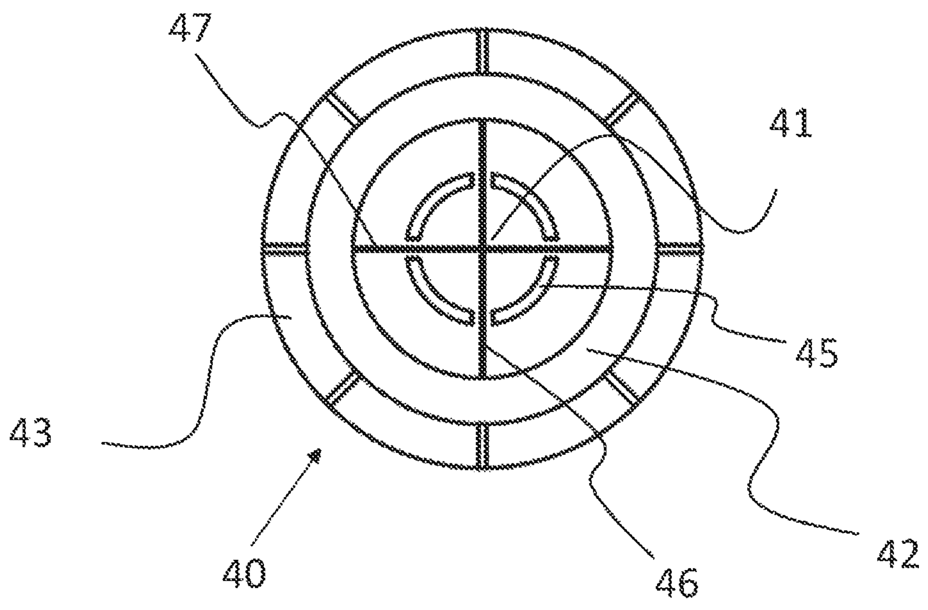
FIG. 7 is a plan view of the sealing element.

FIG. 7 shows a sealing element in a plan view from above. This is designed to be circular and consists of an elastic material, such as for example polyisoprene.

The sealing element 40 comprises a piercing region 41 into which a spike (not represented) can be inserted in this exemplary embodiment. The piercing region 41 is provided with a ring-shaped marking 45. The piercing region 41 is slotted in a cross shape via the slots 46, 47. Such slotted sealing elements are used in particular to connect a spike for removing the liquid. These are also commonly referred to as stoppers.

In particular, for an inlet port through which, for example, a pharmaceutically active ingredient can be filled into the container 2, non-slotted sealing elements are generally used. These are also commonly referred to as septum (not represented). These can also have a different geometry (not represented).

An annular groove 42 runs around the piercing region 41, to which an annular web 43 is connected radially outwards, which serves as a form-fitting element.

Figure 8:
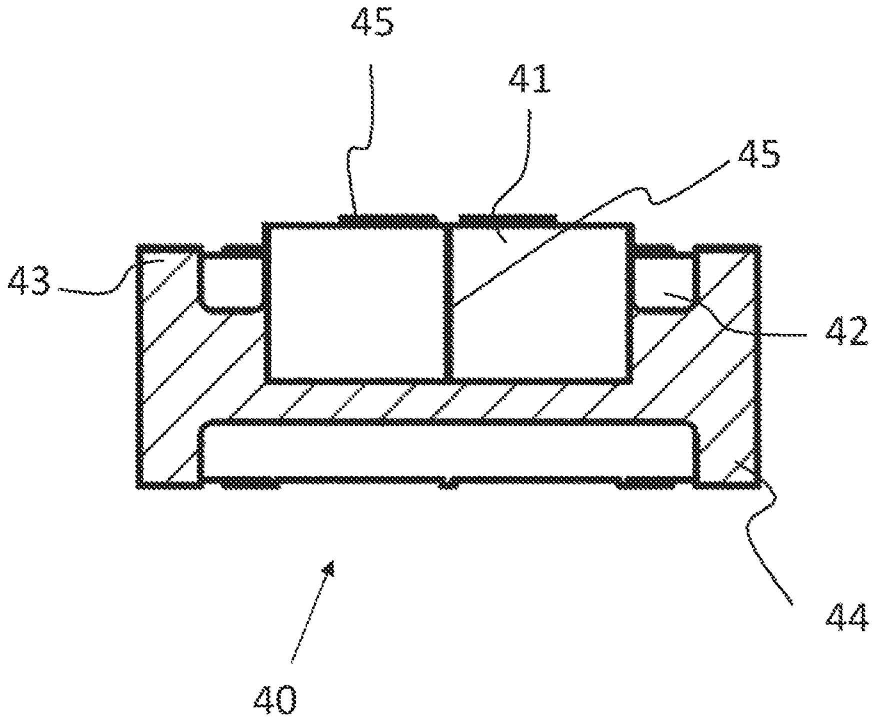
FIG. 8 is a cross-section of the sealing element.

FIG. 8 is a central longitudinal section of the sealing element 40. Since the section runs exactly through a slot 47, the material of the piercing region 41, from which the marking 45 protrudes on the upper side, is not hatched in this representation. The slots 46, 47 do not run to the underside of the sealing element 40, but end before it. When a spike is inserted into the sealing element 40 for the first time, the sealing element tears open below the slots 46, 47. However, the sealing element 40 closes again when the spike is pulled out due to the elasticity of the material.

On the edge side, the sealing element 40 comprises a circumferential ring 43, 44 or an annular web on both its upper side and its lower side, which serves as a form-fitting element.

Figure 9:
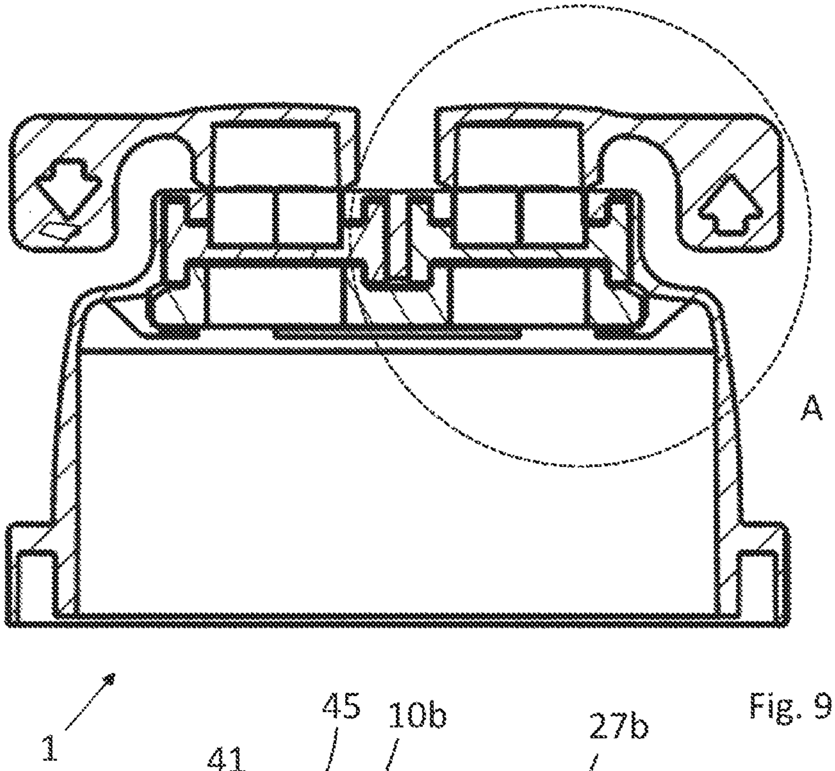
FIG. 9 is a longitudinal section of the closure cap centred along the connections.

FIG. 9 is a longitudinal section of the closure cap 1 in the assembled state, which runs centrally through the connections 10*a*, 10*b*. In this embodiment, two identical sealing elements 40 are used. Two different sealing elements 40 can also be used (not represented).

Figure 10:
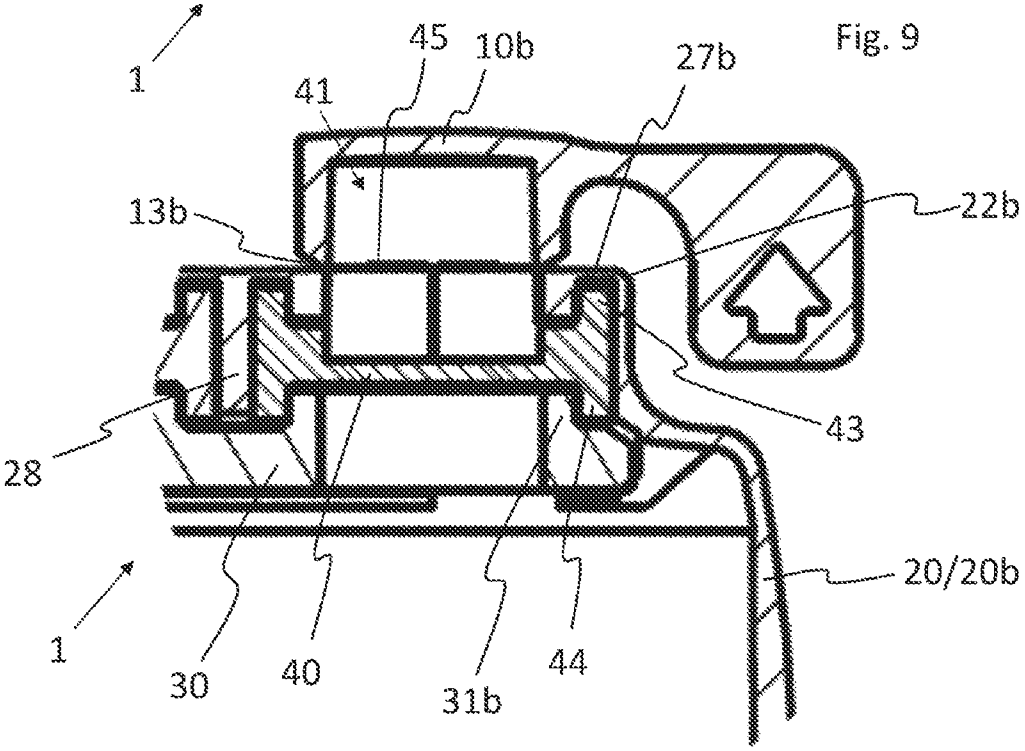
FIG. 10 is a detailed view of the region A of FIG. 9.

FIG. 10 is a detailed view of the region A of FIG. 9, in which the region of one of the sealing elements 40 is represented. The sealing element 40 is now located between the flap 30 and the underside of the closure cap 1. The flap 30 rests on the underside of the base body 20. The upper ring 43 of the sealing element 40 sits in the annular groove 27*b* of the connection nozzle 22*b*. This creates a form-fitting connection.

On the underside, the ring 44 of the sealing element 40 sits between the annular web 31*b* of the flap and the bottom 20*a* and the side wall 20*b* of the base body 20 or the connection nozzle 22*b*.

Adjacent to the opposite connection nozzle 22*a*, the ring 44 sits between the web 28, which lies between the connection nozzles 22*a*, 22*b* and which, according to the annular groove in which the ring 44 sits, merges into the side walls starting from the point represented here where the side walls of the connection nozzles 22*a*, 22*b* overlap. The web 28 or the side walls of the connection nozzles 22*a*, 22*b* extend downwards to the flap 30. The ring 44 is thus located in a groove which is formed by the flap 30 and the opposite base body 20 or the connection nozzle 22*b*.

The predetermined breaking point 31*b* is located approximately at the height of the upper side of the piercing region 41 of the sealing element 40, from which the marking 45 can protrude. After breaking off the break-off piece 10*b*, the piercing region 41 is easily accessible, in particular for disinfection by wiping.

Figure 11:
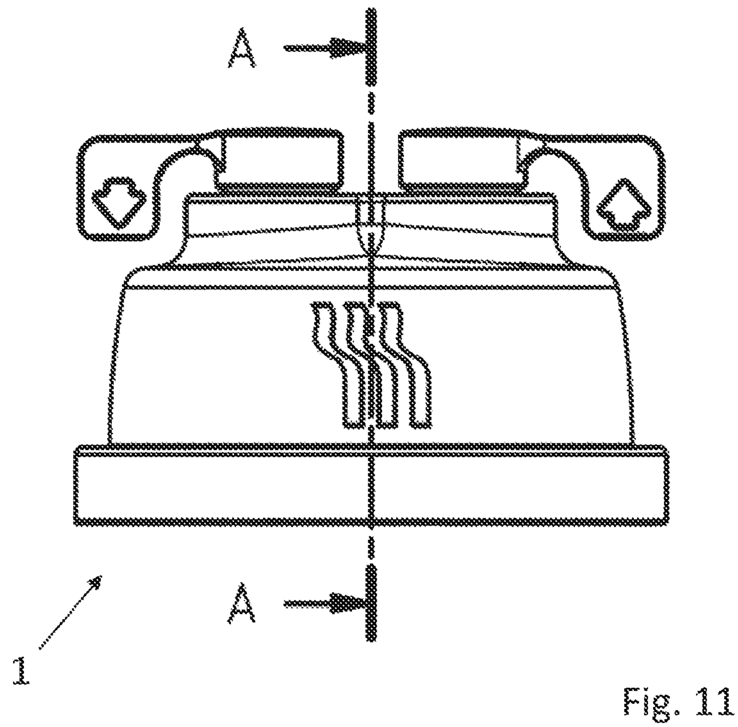
FIG. 11 is a side view and FIG. 12 is a sectional view along the line A-A of FIG. 11.
Figure 12:
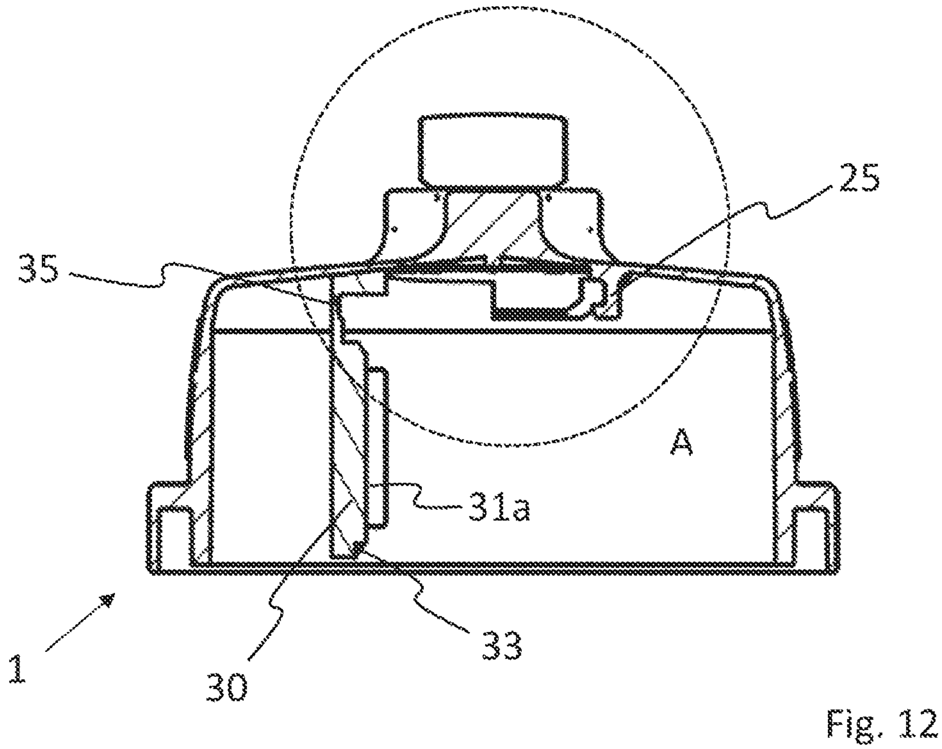

FIG. 11 is a side view of the closure cap and FIG. 12 is a longitudinal section along the line A-A of FIG. 11. FIG. 12 shows the flap 30 in the unassembled state, which comprises the chamfer 33 on one long side. The chamfer 33 can in particular be designed as a 30-60° chamfer.

Figure 13:
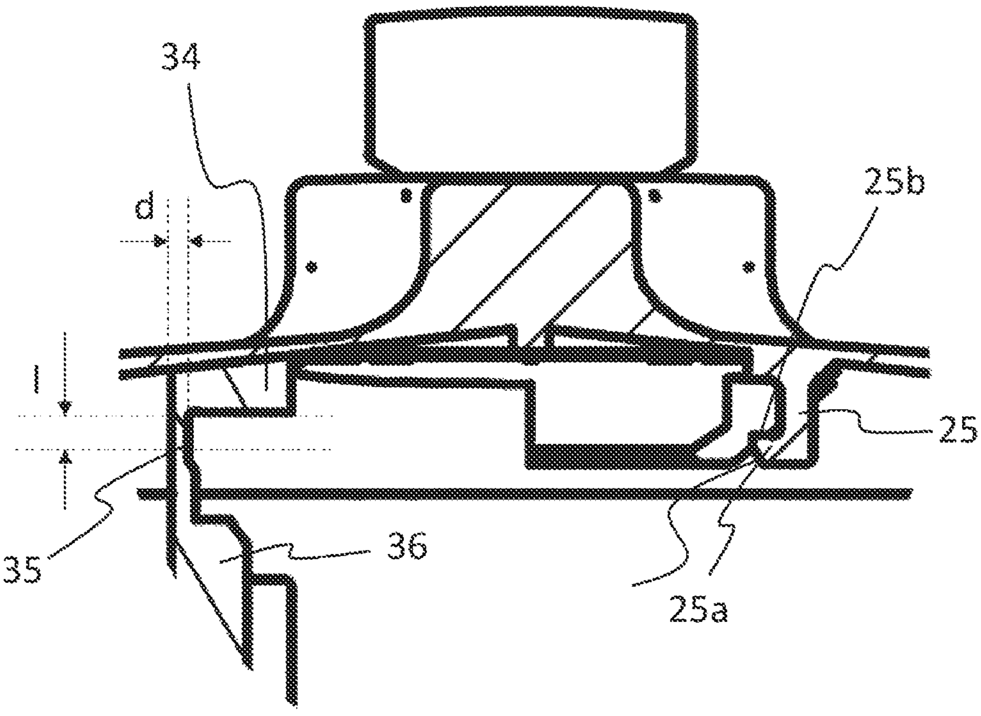
FIG. 13 is a detailed view of the region A of FIG. 12.

The latching element 25 is located on the long side of the flap 30 opposite the film hinge 35. As represented in the detailed view of the region A of FIG. 12 according to FIG. 13, the latching element 25 is designed to be hook-shaped. This comprises a hook 25*a* which, starting from the downwardly extending wall of the latching element 25, is directed radially inwards. The hook 25*a* comprises an inclined surface 25*c* on the front side, past which the chamfer 33 of the flap 30 slides when latching and thus pushes the latching element 25 to the side in a resilient manner. The inclined surface can run at an angle of 30° to 60° to a surface oriented perpendicular to the central axis of the closure cap 1.

As soon as the flap 30 has reached its end position, the latching element 25 springs back and the contact surface 25*b* lies, preferably parallel to the flap 30, under the flap 30, such that the flap 30 is now fixed by the latching element 25.

In the unassembled state, the film hinge 35 extends downwards starting from a base 34. In the assembled state, the base 34 limits the groove in which the ring 43 of the sealing element 40 sits. The film hinge 35 is formed by a region which is thinner than the adjacent wall and has the thickness d of the side wall of the flap 30 in the unassembled state. In this exemplary embodiment, the film hinge 35 extends over a length of the side wall 1.

The ratio of length 1 to thickness d is preferably between 0.5 and 5, particularly preferably between 1 and 3 and quite particularly preferably between 1.5 and 2.5. This provides a region of sufficient length to reduce the risk of breakage.

The thickness d of the film hinge is preferably between 0.2 and 1.0 mm.

Figure 14:
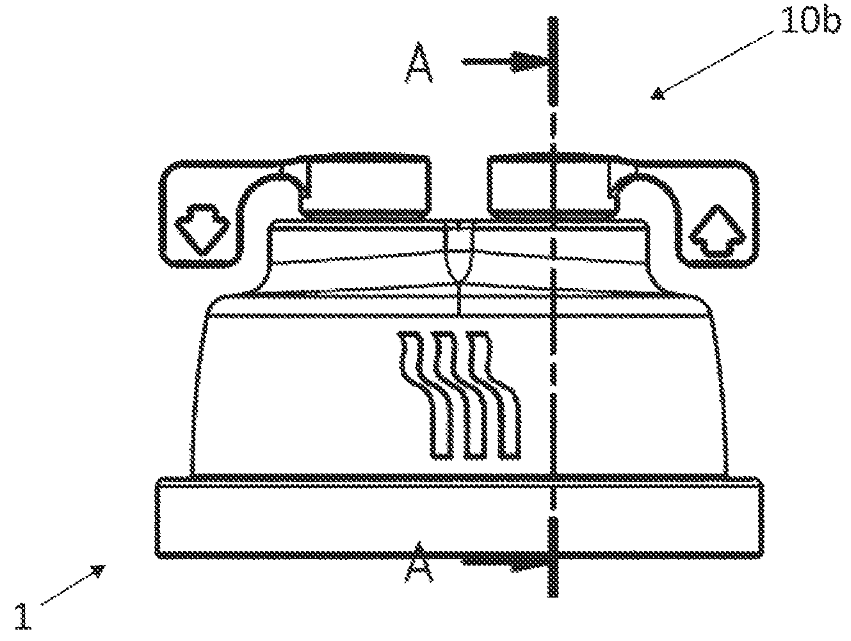
FIG. 14 is a side view and FIG. 15 is a longitudinal section along the line A-A of FIG. 14.
Figure 15:
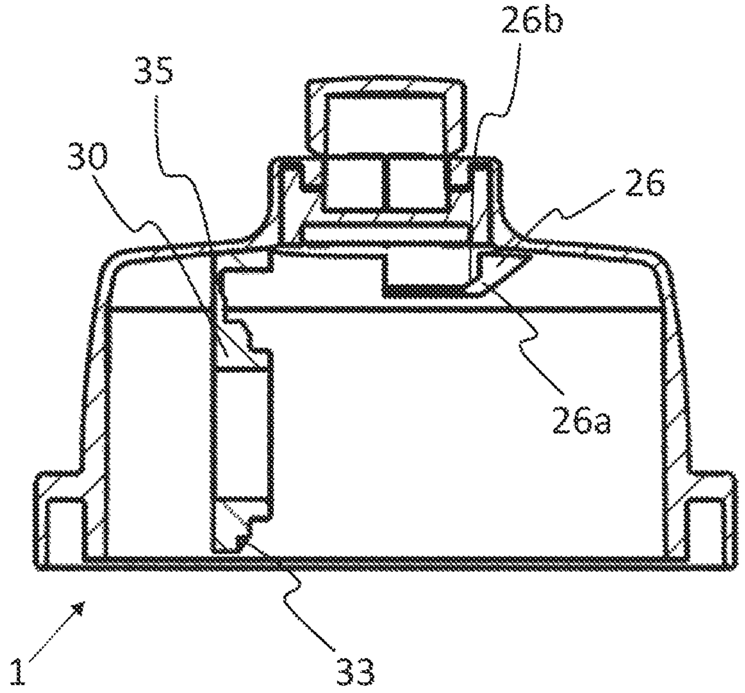

FIG. 14 is a side view of the closure cap 1 and FIG. 15 is a sectional view along the line A-A of FIG. 14. The section also runs through the lateral latching element 26, which encloses the corners of the flap 30 opposite the film hinge 35 in the assembled state. The latching element 26 also comprises a hook 26*a* with a contact surface 26*b* for the flap 30.

Preferably, in contrast to the latching element 25, the contact surface in the unassembled state is not aligned parallel to the plate-shaped flap 30, but runs obliquely. In particular, this can facilitate the escape of the hook 26*a* during latching. The hooks 26*a* enclose the corners of the flap 30 such that they cannot move like a flat leaf spring like the latching element 25 on the long side of the flap 30. The latching element 26 can also serve to position the flap 30 and absorbs forces acting in the direction of the axis of the film hinge 36, for example when a spike is inserted obliquely.

Figure 16:
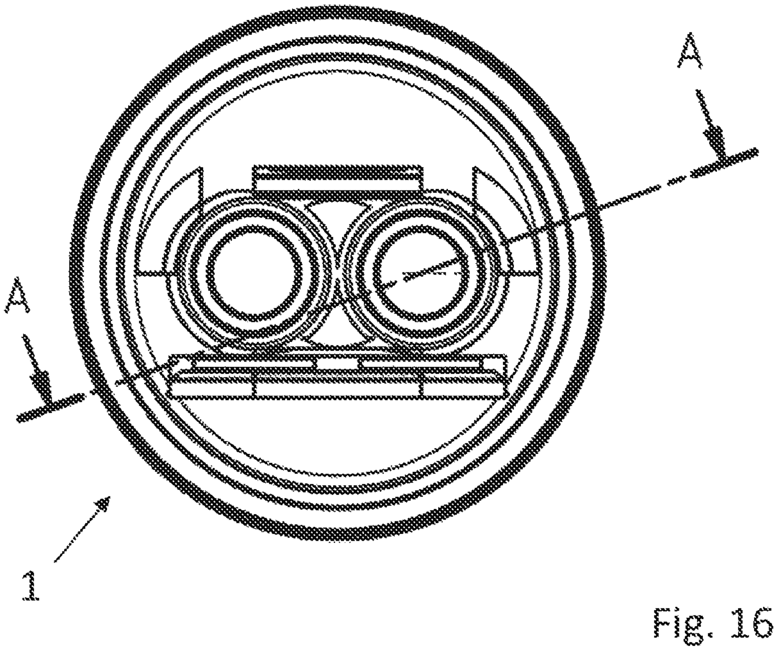
FIG. 16 is a plan view of the underside and FIG. 17 is a longitudinal section along the line A-A of FIG. 16.

FIG. 16 is a plan view of the underside of the closure cap 1.

Figure 17:
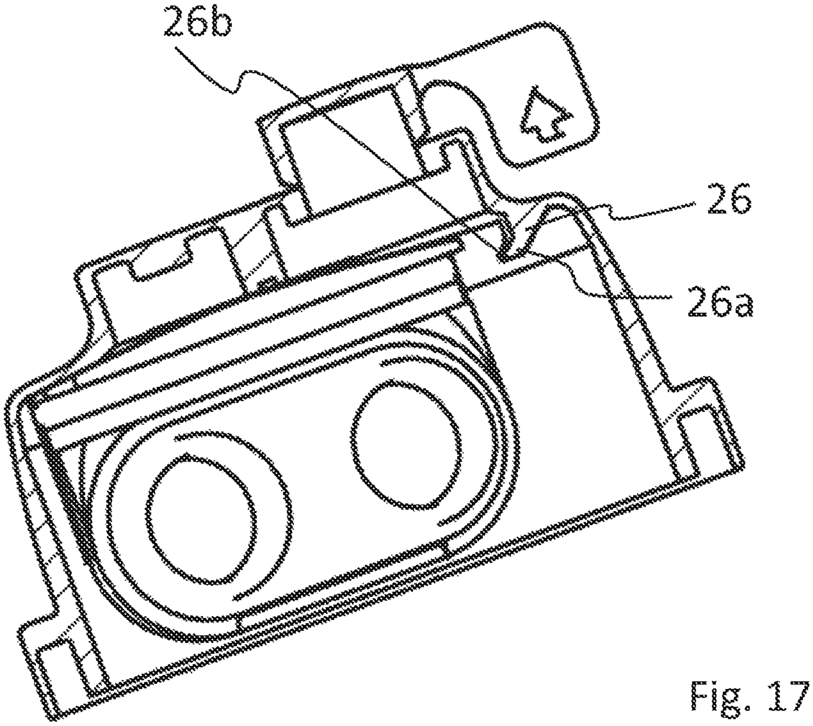

FIG. 17 is a sectional view along the line A-A, which runs through the latching element 26 at a different location than the section according to FIG. 15. The latching element 26 encloses the corner of the flap 26. In the assembled state, the contact surface 26*b* for the flap is aligned obliquely to the flap 30.

Figure 18:
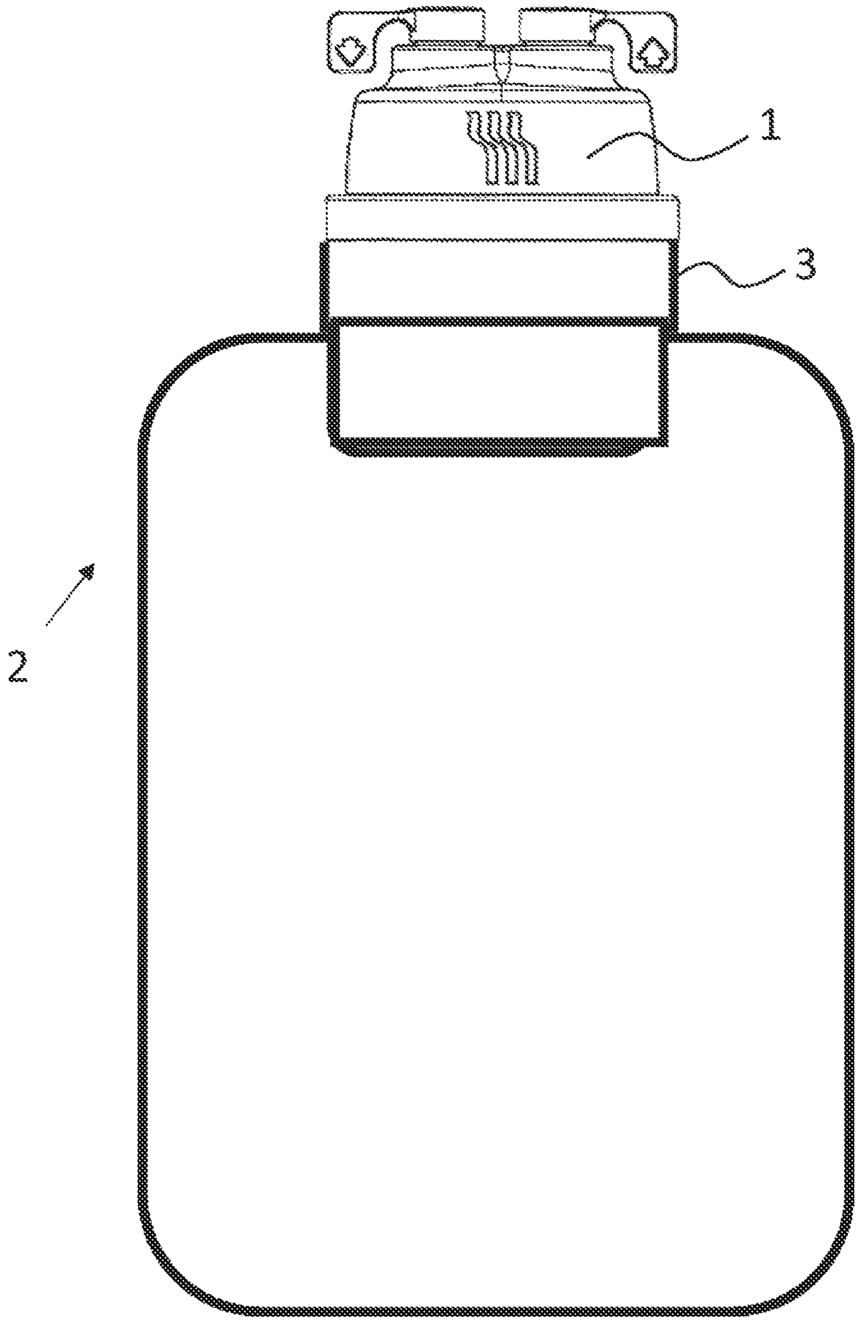
FIG. 18 is a schematic view of a container provided with the closure cap.

FIG. 18 shows a schematic view of a container 2 according to the invention. The cap 1 represented above is connected to a lower part 3, which provides most of the volume of the container 2.

Figure 19:
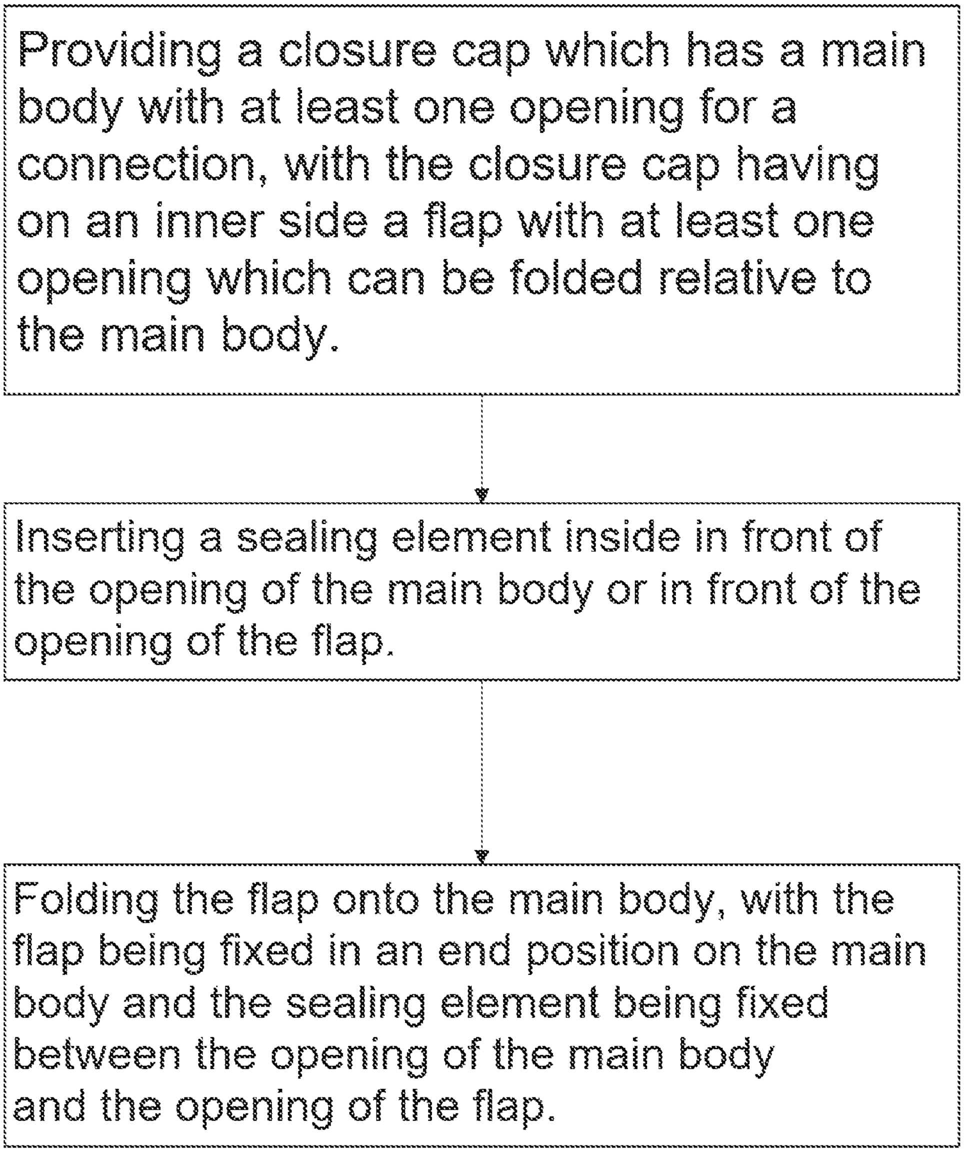
FIG. 19 shows the steps of a method according to the invention for assembling a closure cap according to an exemplary embodiment of the invention.

FIG. 19 shows the steps of a method according to the invention in accordance with an exemplary embodiment of the invention.

First, a closure cap 1 is provided which has a base body 20 with at least one opening 24*a*, 24*b* for a connection 10*a*, 10*b*, with the closure cap 1 having on an inner side a flap 30 with at least one opening 32*a*, 32*b* which can be folded relative to the base body 20. This may in particular be the closure cap 1 represented above.

A sealing element 40 is then inserted inside into the opening 24*a*, 24*b* of the base body or into the opening 32*a*, 32*b* of the flap 30.

The flap 30 is then folded or pivoted onto the base body 20, with the flap 30 being fixed on the base body 20 in an end position and thus fixing the sealing element 40 between the opening 24*a*, 24*b* of the base body 20 and the opening 32*a*, 32*b* of the flap 30.

The invention makes it possible to provide a closure cap for a medical container that can be assembled easily and safely.

LIST OF REFERENCE NUMERALS

1 Closure cap
2 Container
3 Head part
10*a*, 10*b* Connection
11*a*, 11*b* Break-off piece
12*a*, 12*b* Wing grip
13*a*, 13*b* Predetermined breaking point
20 Base body
20*a* Bottom (of the base body)
20*b* Side wall (of the base body
21 Connection flange
22*a*, 22*b* Connection nozzle
23 Groove
24*a*, 24*b* Opening
25 Latching element
25*a* Hook
25*b* Contact surface
25*c* Inclined surface
26 Lateral latching element
26*a* Hook
26*b* Contact surface
27*a*, 27*b* Annular groove
28 Web
30 Flap
31*a*, 31*b* Annular web
32*a*, 32*b* Opening
33 Chamfer
34 Base
35 Film hinge
40 Sealing element
41 Piercing region
42 Groove
43 Ring
44 Ring

45 Marking
46,47 Slot

The invention claimed is:

1. A closure cap for a container filled with a medical liquid, the closure cap comprising:

a base body and at least one connection with a sealing element which can be pierced with a spike or a needle to remove the medical liquid, and a flap arranged inside on an underside of the base body of the closure cap and connected to the base body by a hinge, the sealing element being fixed to the closure cap by the flap folded against the base body.

2. The closure cap according to claim 1, wherein the sealing element is closed with a tamper-evident closure, in particular is covered with a break-off piece which is connected to the base body of the closure cap via a predetermined breaking point surrounding the sealing element.

3. The closure cap according to claim 1, wherein the sealing element has a circumferential ring which sits in a groove of the base body and/or the flap.

4. The closure cap according to claim 1, wherein the flap folded against the base body is latched to the base body.

5. The closure cap according to claim 1, wherein the flap is designed as a plate with at least one opening in which a piercing region of the sealing element is located.

6. The closure cap according to claim 1, wherein the hinge is designed as a film hinge.

7. The closure cap according to claim 1, wherein the closure cap has at least two connections, each with a sealing element.

8. The closure cap according to claim 7, wherein the flap is designed as a single flap which fixes the sealing elements of the at least two connections to the closure cap.

9. The closure cap according to claim 1, wherein the hinge is arranged on a long side of the flap, wherein the flap is latched to the base body on an opposite long side.

10. The closure cap according to claim 9, wherein a latching body of the base body engages around a corner of the opposite long side of the flap.

11. The closure cap according to claim 10, wherein the corner is rounded.

12. The closure cap according to claim 1, wherein the base body and the flap are part of a one-piece plastic injection-molded part.

13. The closure cap according to claim 7, where the closure cap has exactly two connections, each with a sealing element.

14. A container filled with a medical liquid comprising a closure cap according to claim 1.

15. The container according to claim 13, wherein the container comprises a bottle produced using a Blow-Fill-Seal (BFS) or a Strech-Blow-Molding (SBM) process.

16. The container according to claim 15, wherein the container is sterilized.

17. A method for assembling a closure flap for a container filled with a medical liquid, in particular for the container according to claim 14, comprising the steps:

providing a closure cap which has a base body with at least one opening for a connection, wherein the closure cap has inside on an underside of the base body a flap with at least one opening which can be folded relative to the base body;

inserting a sealing element inside in front of the opening of the base body or in front of the opening of the flap; and folding the flap onto the base body, wherein the flap is fixed in an end position on the base body and the sealing element is fixed between the opening of the base body and the opening of the flap.

18. The method according to claim 17, wherein the sealing element is inserted into the opening of the base body or the flap in such manner that it is held centred centered and securely in position.

* * * * *